Sept. 8, 1953　　　　J. E. CLELAND ET AL　　　　2,651,577
METHOD OF PRODUCING A CARAMEL COLOR OF HIGH TINCTORIAL
POWER IN THE FORM OF SOLID PARTICLES OR A DRY POWDER
Filed Jan. 11, 1951
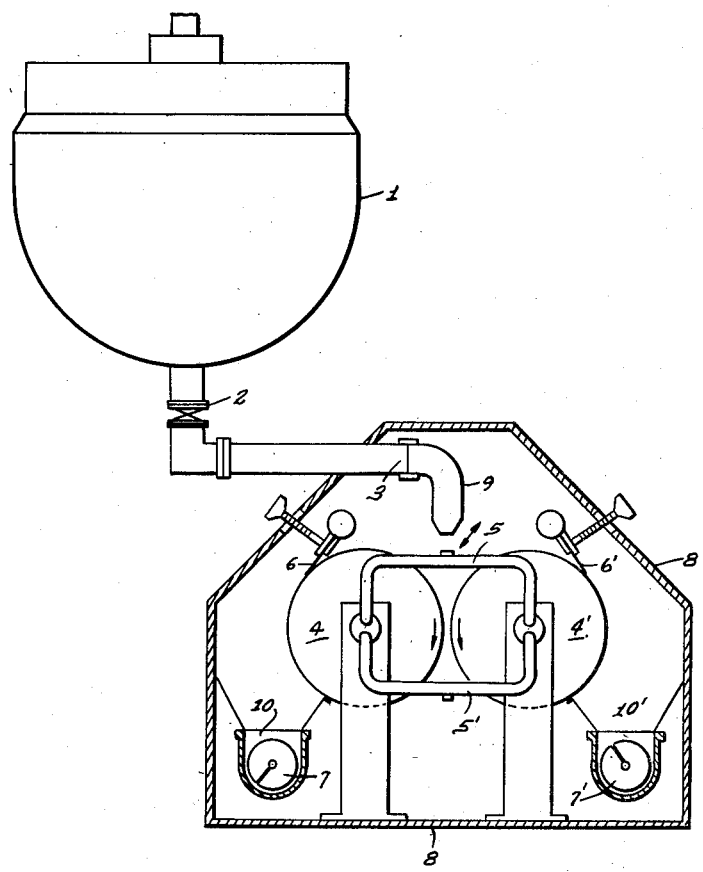
INVENTOR.
JAMES E. CLELAND
HARRY W. CURRY
BY　ALVIN L. MEYER
Greene, Pinley & Durr
ATTORNEYS Patented Sept. 8, 1953

2,651,577

UNITED STATES PATENT OFFICE 2,651,577

METHOD OF PRODUCING A CARAMEL COLOR OF HIGH TINCTORIAL POWER IN THE FORM OF SOLID PARTICLES OR A DRY POWDER

James E. Cleland, Granite City, Ill., Harry W. Curry, St. Louis, Mo., and Alvin L. Meyer, Granite City, Ill., assignors to Union Starch & Refining Company, Columbus, Ind., a corporation of Indiana Application January 11, 1951, Serial No. 205,508

4 Claims. (Cl. 99—148)

This invention relates to a novel method of economically producing a solid dry powdered caramel color of high tinctorial power.

The primary objective of this invention is to provide an inexpensive method for the production of a caramel color of high tinctorial power in the form of solid particles or a dry, easily soluble powder of low moisture content. Another objective is to provide a dry, powdered caramel color of decreased hygroscopicity.

Caramel color may, of course, be dried by any of the conventional methods such as spray drying, or heated rolls, in a vacuum, on trays in a vacuum chamber or by any of the other well known methods ordinarily applied to solutions of this type. It is not, however, an easy material to dry because it is very viscous in high concentrations and ordinarily extremely hygroscopic when reduced to solid or relatively dry form.

In addition, any of the conventional methods have been expensive when applied to a product of relatively low price such as caramel color. Probably it is for these reasons that there have been no dry, powdered caramel colors on the market in any quantity although there are obvious reasons for such a product finding ready acceptance.

Most conventional devices available for drying the non-crystallizing solids from viscous solutions or syrups, such as caramel color, in large volume involve a very considerable capital investment. The cost of operation is likely to be impractical also and may run as much as one-third of the total cost per pound of the liquid product for inexpensive materials like caramel color.

This invention takes advantage of the fact that caramel colors made in open kettles when burned to a tinctorial power of 20-50 are essentially dry or free of most of the moisture at the conclusion of the burning step and an objective of the invention is to convert the material into granular or powdered form at this stage by economical means.

The tinctorial power is measured by dissolving 0.5 gram of 38° Bé. color in 500 ml. of water and matching the resultant solution (in a one inch cell) against lovibond color slides of the caramel color or No. 52 series.

In the conventional processes of manufacturing caramel color in open kettles the sugar is burned to a tinctorial power of 20 to 30. At this point the water content of the mass is only about 4.0 to 6% and it has a high viscosity so that it must not be allowed to cool in the kettle. In order to stop the reaction and convert the product into a form of practical fluidity at room temperature, water is added to the product according to these conventional processes.

According to the present invention the sugar is burned to a tinctorial power of 20-50 (preferably closer to the upper limit) and even though the product contains only 4-6% of water, no additional water is added. Instead, the mass is discharged at the elevated temperature onto a chilling and breaking mechanism while maintaining the flow of heat to the kettle containing the burned sugar in order to keep the said burned product liquid until it can be discharged.

The finished color obtained by breaking and grinding the chilled mass has a tinctorial power of approximately 45 and 4.5% of moisture.

The cooling operation is a critical one and it must be accomplished in a relatively short time because the mass in the kettle cannot be held at high temperatures for extended periods as the reaction may go too far with corresponding damage to quality. We are aware that some products of similar properties can be discharged from vacuum dehydraters onto steel belts which run through cooling tunnels and the friable product will be discharged from the belt in condition to be ground to a powder.

The simple belt cooling device will not work advantageously for caramel color of the viscosity, tackiness and specific heat indicated because the material will not flow to a thin uniform layer from which the heat can be removed rapidly enough by air cooling to fracture and break away cleanly from the belt as it passes over the discharge pulley.

The cooling device employed in the process of this invention must be of very efficient type to permit removal of the hot liquid from the kettle in limited time. We have found that an arrangement of steel rolls through which cold water may be circulated as the coolant will give satisfactory results.

In the drawing the figure illustrates one arrangement of the equipment for carrying out the process of the invention.

The sugar solution is burned in the kettle 1 which is an open, jacketed kettle. After the desired tinctorial power is obtained the molten mass is fed through valve 2 and steam jacketed pipe 3 having nozzle 9 which is positioned to discharge between the two cooled rollers 4 and 4'. The rolls 4 and 4' are rotated in the direction shown by the arrows. These rolls 4 and 4' are connected to a cold water circulating system 5, 5'. The cooled and hardened caramel color is scraped from the rolls by the scraper knives 6, 6' and falls into the troughs 10, 10' to be carried away by the screw conveyers 7, 7' (shown only diagrammatically). The entire cooling mechanism is preferably enclosed within the housing 8. The rolls 4 and 4' are closely spaced (for example 0.01 to 0.25 inch apart) so that the viscous liquid is forced into a thin layer which adheres to one of the rollers and is cooled by the said roller 4 or 4'.

The following example illustrates how the process may be carried out with the above described apparatus.

Example 4000 lbs. of a corn syrup solution of 45° Bé. is introduced into a steam jacketed kettle of approximately 400 gallons capacity. The solution is heated until a color of 20-50 tinctorial power is obtained. The heat in the jacketed steam kettle is maintained while the product which has a water content of only 4 to 4% is discharged through nozzle 9. The nozzle 9 may move back and forth to spread the solution over the surface of the rolls or a bifurcated nozzle may be employed. Since the liquid is very viscous the diameter of the outlet orifice of nozzle 9 should be at least 1.5 inches. Water at approximately 20° C. is circulated through pipes 5 and rolls 4, 4'.

The hardened product which is conveyed away by the screw conveyors 7 may be pulverized in a hammer mill which may also be enclosed in the housing 8. The product is ground to a size that passes through a U. S. Standard 60-mesh screen and is packed in moisture-proof containers. Dry Ice may be added to the product as it is fed to the grinding mill or a jacketed or refrigerated mill may be employed.

By means of this invention a caramel color of very high tinctorial power in the form of a dry powder is made at low cost. A liquid product of comparable tinctorial power would not be stable and would tend to resinify or coagulate if made by the methods of conventional burning.

We claim:

1. The process of making caramel color in the form of a dry powder of high tinctorial power comprising the steps of burning a sugar solution in an open kettle to obtain a tinctorial power of 20-50 and a water content of 4-7%, discharging the burned product while maintaining the heat of said kettle to keep the mass in a liquid state during the discharging of the said kettle and rapidly cooling the mass immediately after discharging to produce a hardened friable mass.

2. The process as set forth in claim 1 in which the sugar solution treated is a corn syrup.

3. The process of making caramel color in the form of a dry powder of high tinctorial power comprising the steps of burning a sugar solution in an open kettle to obtain a tinctorial power of 20-50 and a water content of 4-7%, discharging the burned product while maintaining the heat of said kettle to keep the mass in a liquid state during the discharging of the said kettle and rapidly cooling the mass immediately after discharging by feeding it directly between a pair of closely spaced rotating cooling rolls, scraping the hardened mass from the rolls and grinding the product.

4. The process as set forth in claim 3 in which the sugar solution treated is corn syrup with a gravity of at least 45° Bé.

JAMES E. CLELAND.
HARRY W. CURRY.
ALVIN L. MEYER.

References Cited in the file of this patent

UNITED STATES PATENTS

| Number | Name | Date |
| --- | --- | --- |
| 1,418,945 | Luers | June 6, 1922 |